(12) United States Patent
Huang

(10) Patent No.: US 7,538,288 B1
(45) Date of Patent: May 26, 2009

(54) TOUCH PANEL

(75) Inventor: Wei-Lung Huang, Fongshan (TW)

(73) Assignee: Mildex Optical Inc. (TW)

( * ) Notice: Subject to any disclaimer, the term of this patent is extended or adjusted under 35 U.S.C. 154(b) by 0 days.

(21) Appl. No.: 12/058,922

(22) Filed: Mar. 31, 2008

(51) Int. Cl.
*H01H 1/10* (2006.01)

(52) U.S. Cl. .................. 200/512; 200/600; 345/173

(58) Field of Classification Search .............. 200/5 A, 200/511, 512, 600; 345/173, 174
See application file for complete search history.

(56) References Cited

U.S. PATENT DOCUMENTS

| | | | | |
|---|---|---|---|---|
| 4,920,343 A | * | 4/1990 | Schwartz | 341/33 |
| 5,239,152 A | * | 8/1993 | Caldwell et al. | 200/600 |
| 6,072,126 A | * | 6/2000 | Shiga et al. | 174/250 |
| 6,943,705 B1 | * | 9/2005 | Bolender et al. | 341/33 |

* cited by examiner

*Primary Examiner*—Kyung Lee
(74) *Attorney, Agent, or Firm*—Hershkovitz & Associates, LLC.; Abraham Hershkovitz

(57) ABSTRACT

A touch panel has an upper conductive layer, a lower conductive layer, a substrate and multiple electrical connectors. The upper conductive layer has an upper film and two X-electrodes being formed adjacent to the upper film. The lower conductive layer has a lower film, two Y-electrodes and multiple through holes. The Y-electrodes are formed adjacent to the lower film and perpendicularly to the X-electrodes. Each through hole corresponds to an X or Y-electrode. The substrate has multiple wires and multiple mounting holes. Each wire is formed on a bottom of the substrate and aligned with the X or Y-electrode. The mounting holes are formed through the substrate and respectively aligned to the through holes. Each electrical connector is mounted through corresponding mounting and through holes and connects the wires and electrodes. Therefore the touch panel is easily produced with high-precision flatness.

10 Claims, 7 Drawing Sheets

TOUCH PANEL

BACKGROUND OF THE INVENTION

1. Field of the Invention

The present invention relates to a touch panel, especially to a touch panel with good flatness characteristics.

2. Description of the Related Art

A touch panel is for operating various electronic devices. With reference to FIG. 8, a conventional resistive touch panel has a substrate (51), a lower conductive layer (52), an upper conductive layer (53) and a flexible printed circuit board (54).

The lower conductive layer (52) is disposed on the substrate (51) and has two opposite X-edges and two X-axis wires (521). The X-axis wires (521) are respectively formed adjacent to the two opposite X-edges and each X-axis wire (521) has a terminus (521a) extending to one of the X-edges.

The upper conductive layer (53) is adhered to the lower conductive layer (52) and has two opposite Y-edges, two opposite X-edges and two Y-axis wires (531). The X-edges of the upper conductive layer (53) correspond to the X-edges of the lower conductive layer (52). The Y-axis wires (531) are respectively formed adjacent to the Y-edges of the upper conductive layer (53) and each Y-axis wire (531) has a terminus (531a). The terminuses (531a) of the Y-axis wires (531) extend to the one of the X-edges of the upper conductive layer (53) and respectively correspond to the terminuses (521a) of the lower conductive layer (52).

The flexible printed circuit board (54) is mounted between the lower conductive layer (52) and the upper conductive layer (53) and is electrically connected to the terminuses (521a, 531a) of the X-axis wires (521) and Y-axis wires (531).

Being mounted between the lower conductive layer (52) and the upper conductive layer (53), the flexible printed circuit board (54) may cause an outer surface to be uneven. Variable thickness of the X-axis wires (521) and the Y-axis wires (531) may also cause the outer surface to be uneven and lead to frequent rejections. Therefore it is hard to maintain a high precision flatness of a touch panel.

To overcome the shortcomings, the present invention provides a touch panel with good flatness characteristics to mitigate or obviate the aforementioned problems.

SUMMARY OF THE INVENTION

The main objective of the present invention is to provide a touch panel that allows a flexible printed circuit board to be mounted beneath the touch panel instead of being mounted between the lower and upper conductive layer to maintain high precision flatness of the touch panel.

To achieve the objective, the touch panel in accordance with the present invention has an upper conductive layer, a lower conductive layer, a substrate and multiple electrical connectors.

The upper conductive layer has an upper film and two X-electrodes. The X-electrodes are respectively formed adjacent to the upper film.

The lower conductive layer is aligned with and adhering beneath the upper conductive layer and has a lower film, two Y-electrodes and multiple through holes. The Y-electrodes are respectively formed adjacent to the lower film. The through holes are formed through the lower conductive layer and correspond to the electrodes.

The substrate is mounted beneath the lower conductive layer using optical adhesive and has a bottom, multiple wires and multiple mounting holes. The wires are formed on the bottom, respectively aligned with the electrodes. The mounting holes are formed through the substrate and positioned on the wires, and aligned with the through holes of the lower conductive layer.

The electrical connectors are respectively mounted through the mounting and through holes to connect the wire and a corresponding electrode.

Therefore the touch panel is easily produced with high-precision flatness.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
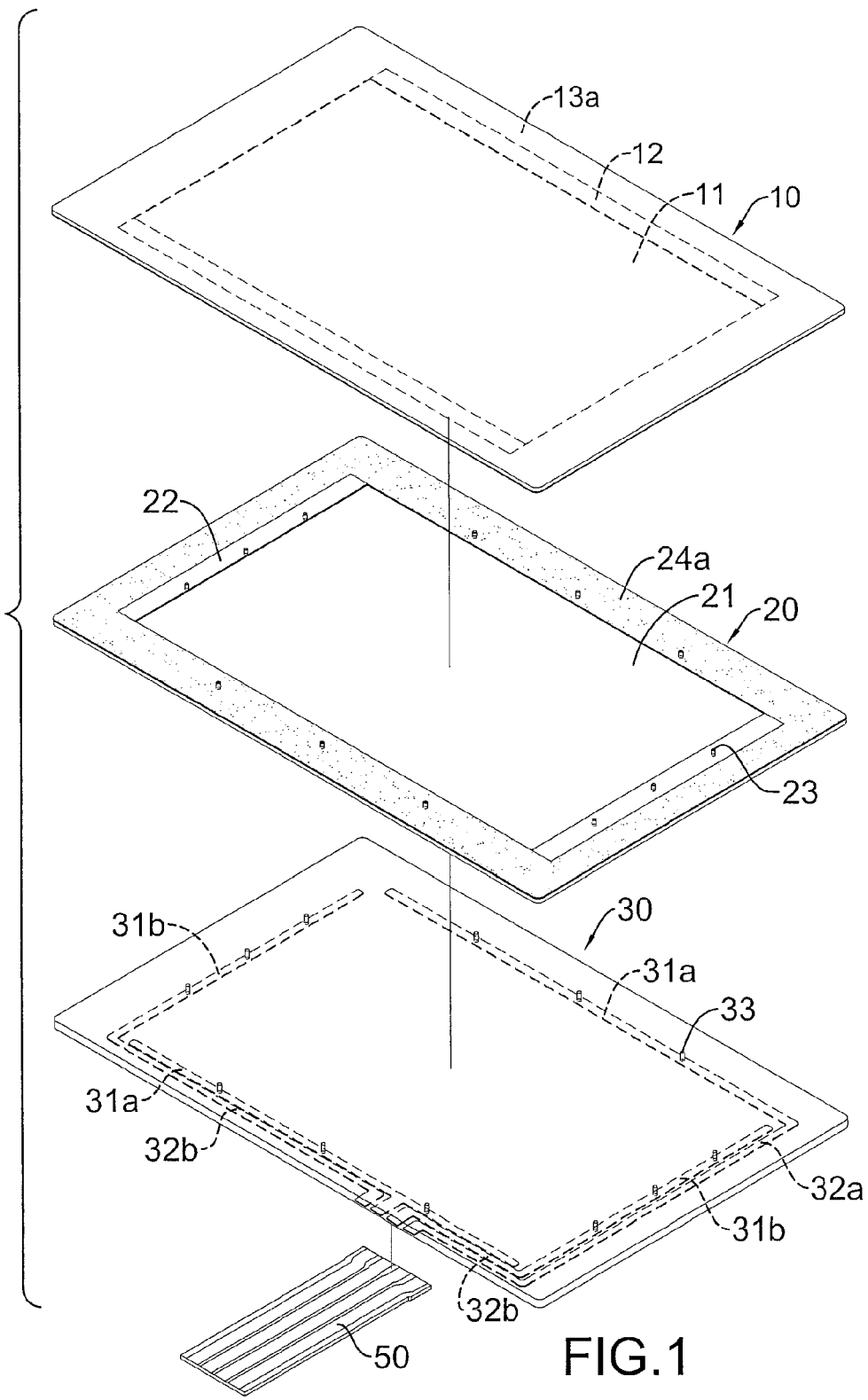
FIG. 1 is an exploded perspective view of a touch panel in accordance with the present invention, with wires, and upper film and X-electrodes shown in phantom lines.

With reference to FIGS. 1, 3, 4 and 5, a touch panel in accordance with the present invention comprises an upper conductive layer (10), a lower conductive layer (20), a substrate (30), multiple electrical connectors (40a, 40b) and may have a flexible printed circuit board (50).

Figure 6:
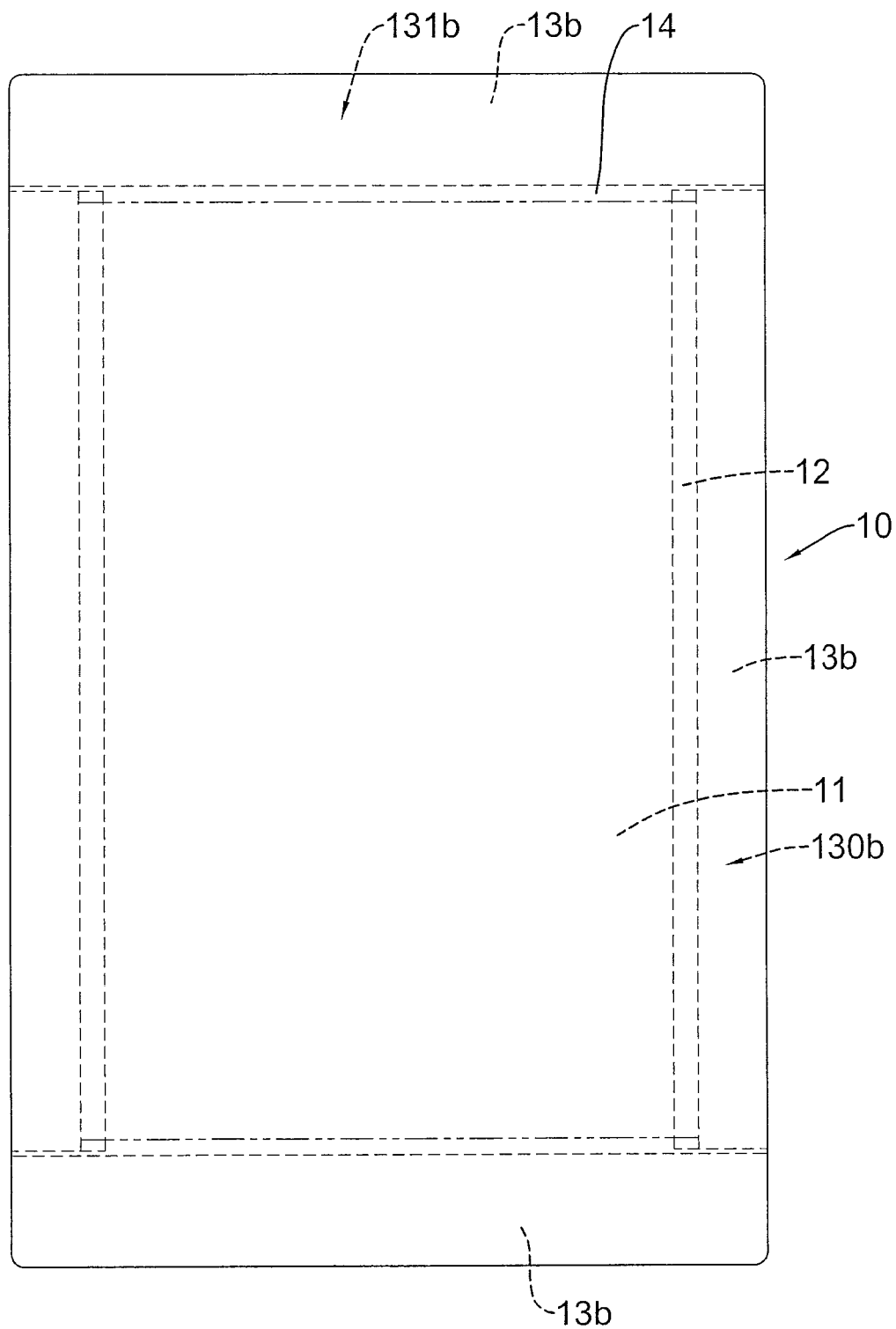
FIG. 6 is a top view of a second embodiment of the upper conductive layer in accordance with the present invention, with Y-electrodes, an upper film, X-section and Y-section shown in phantom lines.

With further reference to FIG. 6, the upper conductive layer (10) has a lower surface, an upper film (11), two X-electrodes (12) and may have a thickness-compensation coating (13a, 13b). The upper film (11) is formed on the lower surface and has two opposite X-edges. The X-electrodes (12) are respectively formed along the X-edges of the upper film (11) and may be made of silver paste. The thickness-compensation coating (13a, 13b) is formed on the lower surface of the upper conductive layer (10), around the upper film (11) to ensure even thickness of the lower surface of the upper conductive layer (10) and may be implemented as non-conductive ink, silver paste or the like. When the thickness-compensation coating (13b) is silver paste, the coating (13b) has two X-sections (130b) and two Y-sections (131b). The X-sections (130b) respectively connect to the X-electrodes (12). Each Y-section (131b) is separated from the upper film (11) and the X-sections (130b) by a gap (14) to prevent electrical conduction between the Y-section (131b) of the coating (13b) and the X-section (130b) of the coating (13b).

Figure 7:
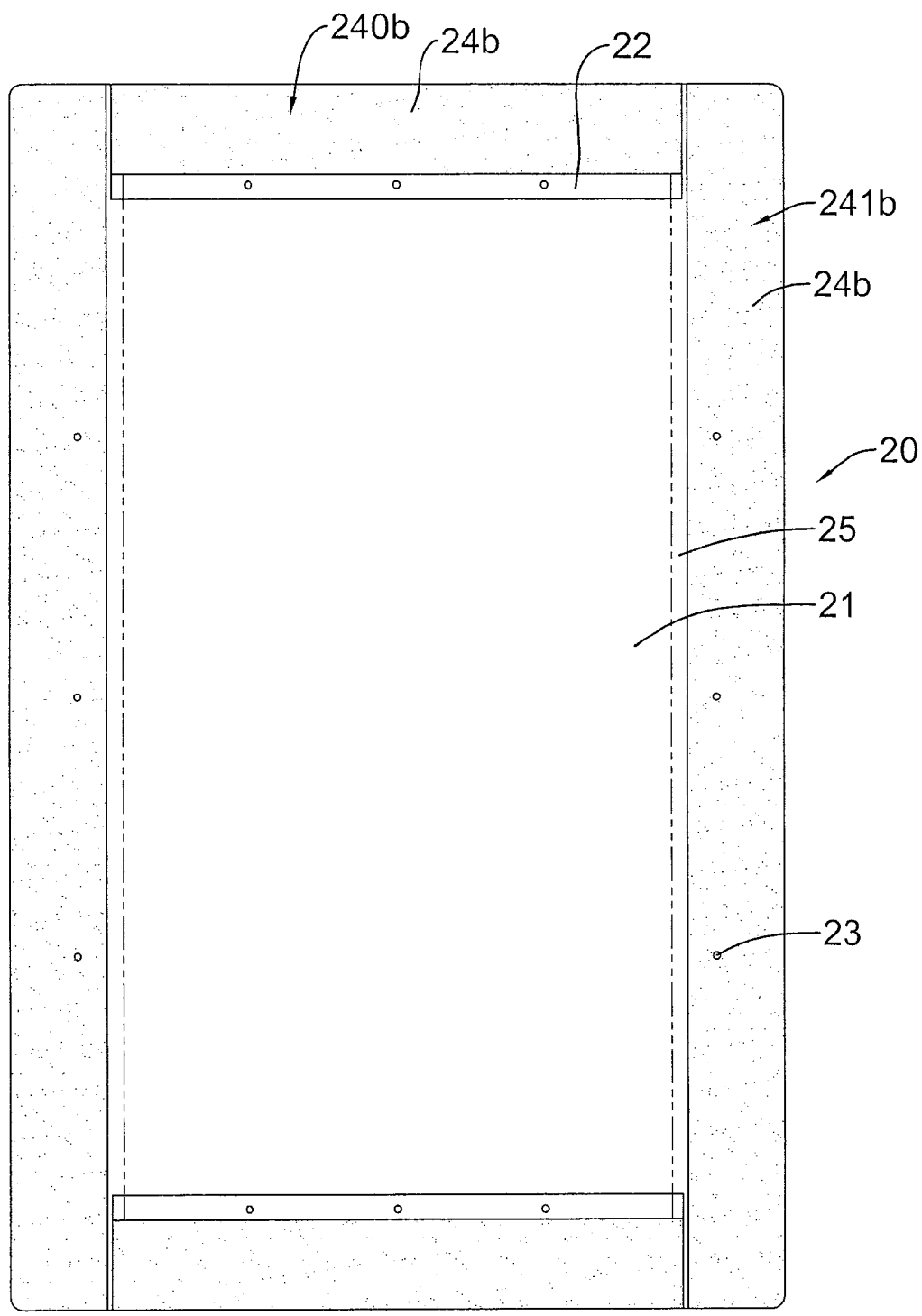
FIG. 7 is a top view of a second embodiment of a lower conductive layer in accordance with the present invention, with a lower film shown in phantom lines.
Figure 8:
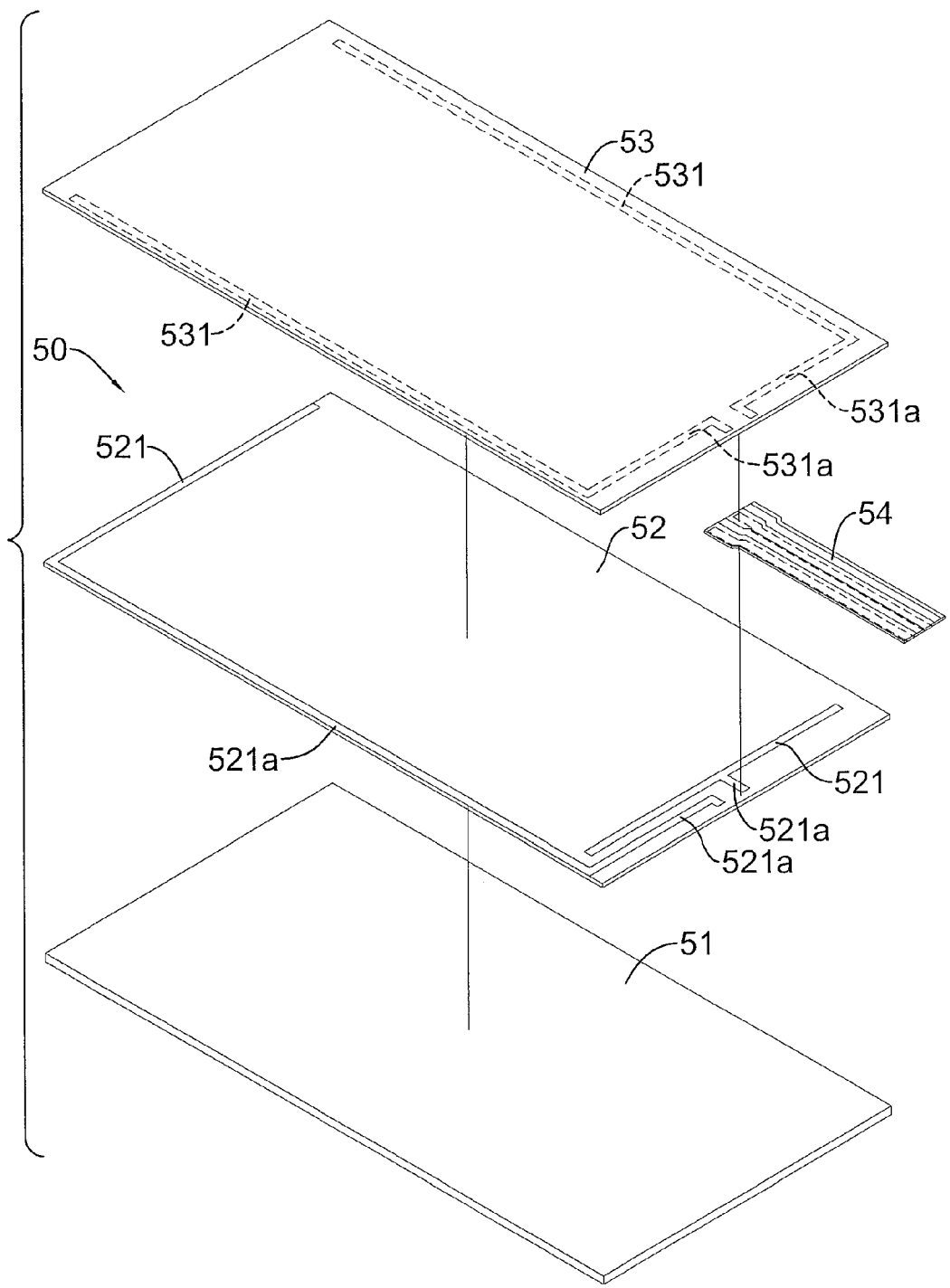
FIG. 8 is an exploded perspective view of a conventional touch panel.

With further reference to FIG. 7, the lower conductive layer (20) is aligned with and adhered beneath the upper conductive layer (10) using adhesive (200) and has an upper surface, a lower film (21), two Y-electrodes (22), multiple through holes (23) and may have a thickness-compensation coating (24a, 24b). The upper surface of the low conductive layer (20) is mounted adjacent to the lower surface of the upper conductive layer (10). The lower film (21) is formed on the upper surface and has two opposite Y-edges and two opposite X-edges. The X-edges of the lower film (21) correspond to the X-edges of the upper film (11). The Y-edges are substantially perpendicular to the X-edges of the lower film (21). The Y-electrodes (22) are respectively formed along the Y-edges of the lower film (21) and may be made of silver paste. The through holes (23) are formed through the lower conductive layer (20) and correspond to the X-electrodes (12) of the upper conductive layer (10) and the Y-electrodes (22) of the lower conductive layer (20). The thickness-compensation coating (24a, 24b) is formed on the upper surface around the lower film (21) of the lower conductive layer (20) to ensure even thickness of the upper surface of the lower conductive later (20) and may be implemented as non-conductive ink, silver paste or the like. When the thickness-compensation coating (24b) is silver paste, the coating (24b) has two Y-sections (240b) and two X-sections (241b). The Y-sections (240b) respectively connect to the Y-electrodes (22). Each X-section (241b) is separated from the lower film (21) and the row sections (240b) by a gap (25) to prevent electrical conduction between the X-section (241b) of the coating (24b) and the Y-section (240b) of the coating (241b).

Figure 2:
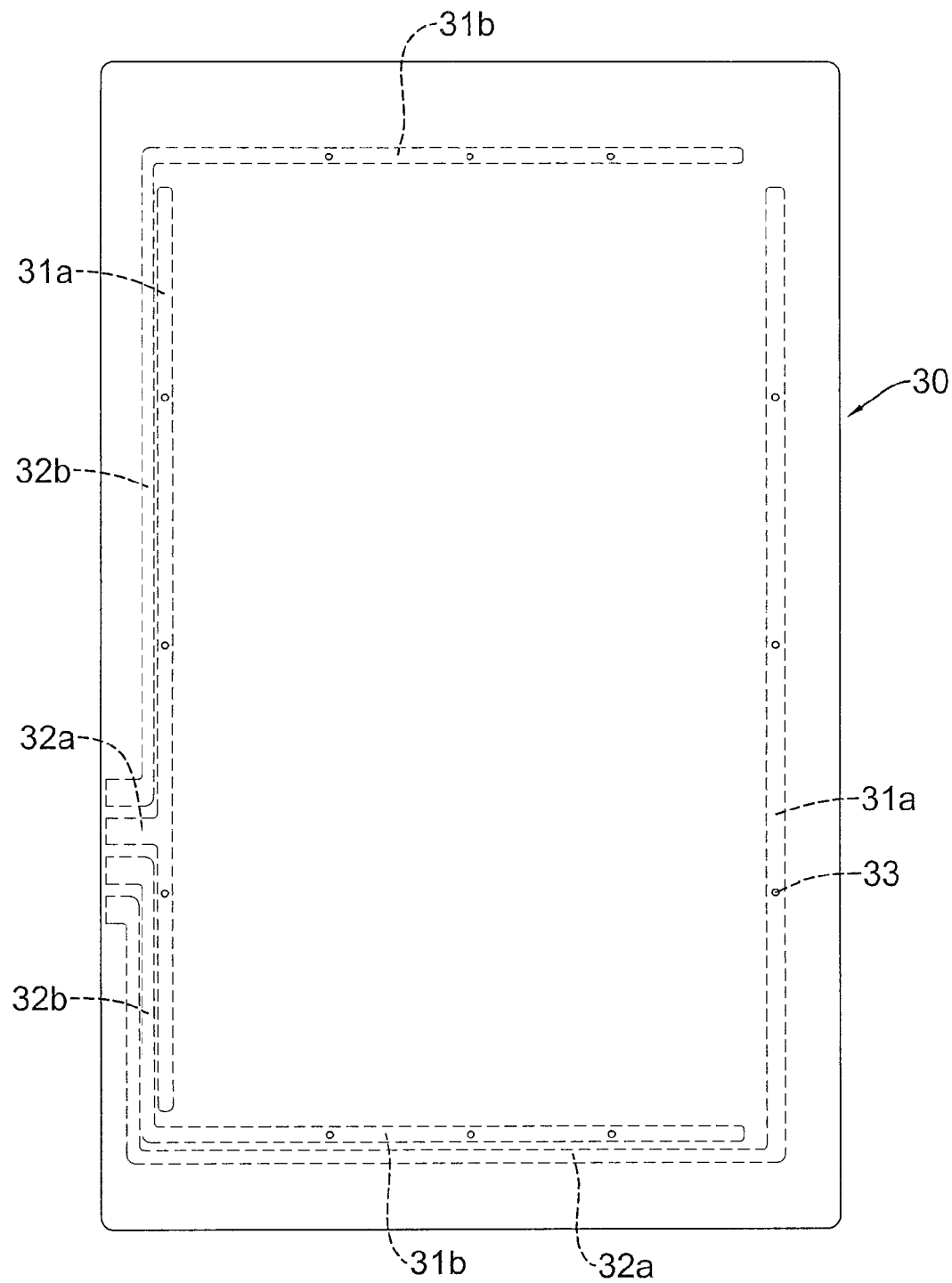
FIG. 2 is a top view of the substrate of the touch panel in FIG. 1.
Figure 3:
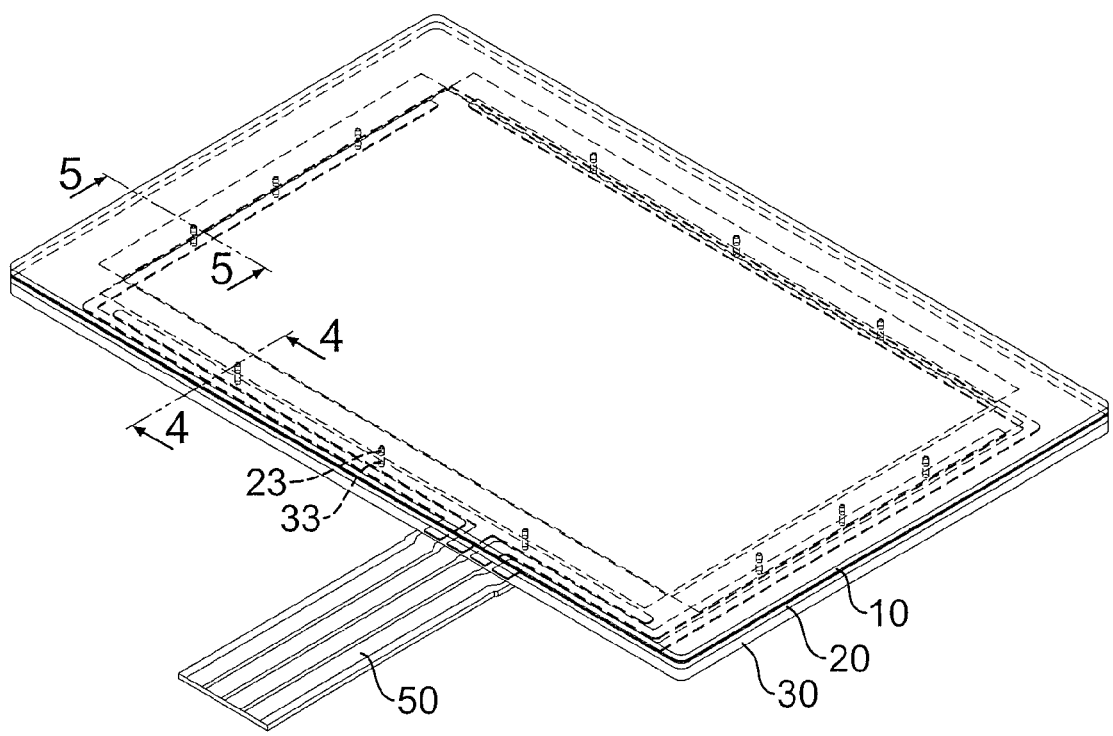
FIG. 3 is a perspective view of the touch panel in FIG. 1.
Figure 4:
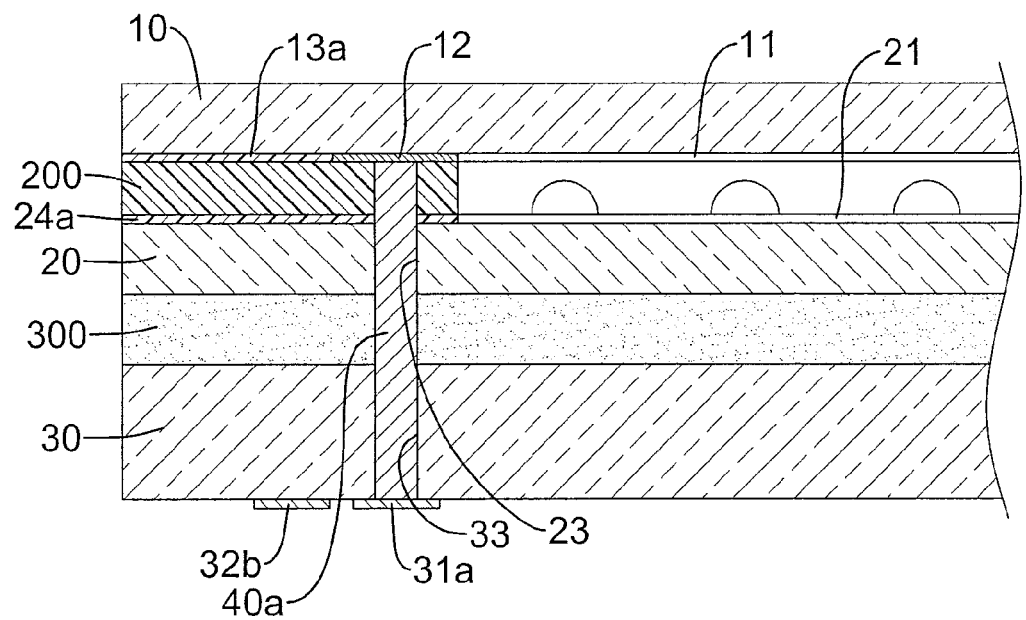
FIG. 4 is a partial cross sectional view taken along line 4-4 in FIG. 3.
Figure 5:
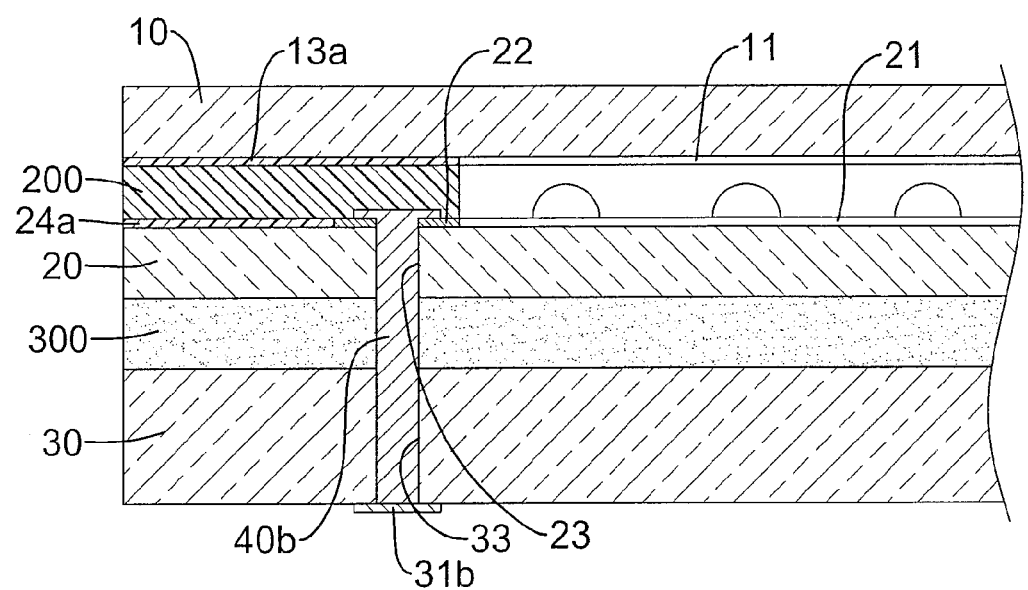
FIG. 5 is a partial cross sectional view taken along line 5-5 in FIG. 3.

With further reference to FIG. 2, the substrate (30) is mounted beneath the lower conductive layer (20) using optical adhesive (300) and has a bottom, multiple wires (31a, 31b) and multiple mounting holes (33). The bottom has an edge having an optional mount. The wires (31a, 31b) are formed on the bottom, respectively aligned with the X-electrodes (12) and the Y-electrodes (22) and each wire (31a, 31b) has a terminus (32a, 32b). The terminuses (32a, 32b) extend towards the edge of the bottom may be at the optional mount of the edge of the bottom of the substrate (30). The mounting holes (33) are formed through the substrate (30) and positioned on the wires (31a, 31b) and respectively aligned with the through holes (23) of the lower conductive layer (20).

The electrical connectors (40a, 40b) are respectively mounted in the mounting holes (33) and each electrical connector (40a, 40b) has a bottom end and a top end. The bottom ends connect to corresponding wires (31a, 31b). The top ends respectively protrude through corresponding through holes (23) of the lower conductive layer (20) and connect to the X-electrodes (12) or the Y-electrodes (22). Each top end may be formed in T-shaped in cross section to increase a contact area between the top end and electrodes (12, 22).

The flexible printed circuit board (50) is mounted on the bottom of the substrate (30), is electrically connected to the terminuses (32a, 32b) of the wires (31a, 31b) and may be mounted at the mount of the edge of the bottom of the substrate (30).

The flexible printed circuit board (50) mounted on the bottom of the substrate (30) receives electrical signals transferred from the X-electrodes (12) and the Y-electrodes (22) via the electrical connectors (40a, 40b). Therefore the flexible printed circuit board (50) does not need to be mounted between the upper and the lower conductive layer (10, 20) and ensures the conductive layers (10, 20) are flat and even. Furthermore, when the upper conductive layer (10) and the lower conductive layer (20) adhere to each other, the thickness-compensation coatings (13a, 13b, 23a, 23b) ensure improved flatness and the touch panel in accordance with the present invention thus maintains good flatness.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A touch panel comprising:
    an upper conductive layer having
        a lower surface;
        an upper film being formed on the lower surface and having two opposite X-edges; and
        two X-electrodes being respectively formed along the X-edges of the upper film;
    a lower conductive layer being aligned with and adhering beneath the upper conductive layer and having
        an upper surface being mounted adjacent to the lower surface of the upper conductive layer;
        a lower film being formed on the upper surface and having
            two opposite X-edges corresponding to the X-edges of the upper film; and
            two opposite Y-edges being substantially perpendicular to the X-edges of the lower film;
        two Y-electrodes being respectively formed along the two Y-edges of the lower film; and
        multiple through holes being formed through the lower conductive layer and corresponding to the X-electrodes and the Y-electrodes;
    a substrate being mounted beneath the lower conductive layer using optical adhesive and having
        a bottom having an edge;
        multiple wires being formed on the bottom, respectively aligned with the X-electrodes and the Y-electrodes and each wire having a terminus extending towards the edge of the bottom; and
        multiple mounting holes being formed through the substrate and positioned on the wires and respectively aligning with the through holes of the lower conductive layer; and
    multiple electrical connectors being respectively mounted in the mounting holes and having
        bottom ends connecting to corresponding wires; and
        top ends protruding through corresponding through holes of the lower conductive layer and connecting to the electrodes.

2. The touch panel as claimed in claim 1 further comprising a flexible printed circuit board being mounted on the bottom of the substrate and electrically connecting to the terminuses of the wires.

3. The touch panel as claimed in claim 1, wherein
    the edge further has a mount; and
    the terminuses of the wires are at the mount of the edge of the bottom of the substrate.

4. The touch panel as claimed in claim 2, wherein
    the upper conductive layer further has a thickness-compensation coating being formed on the lower surface around the upper film of the upper conductive layer; and
    the lower conductive layer further has a thickness-compensation coating being formed on the upper surface around the lower film of the lower conductive layer.

5. The touch panel as claimed in claim 4, wherein the thickness-compensation coatings of the upper and the lower conductive layer are made of non-conductive ink.

6. The touch panel as claimed in claim 4, wherein
    the thickness-compensation coatings of the upper conductive layer are made of silver paste and further has two X-sections respectively connecting to the X-electrodes; and two Y-sections being respectively separated from the upper film and the X-sections by a gap; and the thickness-compensation coating of the lower conductive layer are made of silver paste and further has two Y-sections respectively connecting to the Y-electrodes; and two X-sections being respectively separated from the lower film and the Y-sections by a gap.

7. The touch panel as claimed in claim 1, wherein the X-electrodes and the Y-electrodes are made of silver paste.

8. The touch panel as claimed in claim 1, wherein the upper conductive layer further has a thickness-compensation coating being formed on the lower surface around the upper film of the upper conductive layer; and the lower conductive layer further has a thickness-compensation coating being formed on the upper surface around the lower film of the lower conductive layer.

9. The touch panel as claimed in claim 8, wherein the thickness-compensation coatings of the upper and the lower conductive layer are made of non-conductive ink.

10. The touch panel as claimed in claim 8, wherein the thickness-compensation coatings of the upper conductive layer are made of silver paste and further has two X-sections respectively connecting to the X-electrodes; and two Y-sections being respectively separated from the upper film and the X-sections by a gap; and the thickness-compensation coating of the lower conductive layer are made of silver paste and further has two Y-sections respectively connecting to the Y-electrodes; and two X-sections being respectively separated from the lower film and the Y-sections by a gap.

* * * * *